US009253067B2

(12) United States Patent
Rao et al.

(10) Patent No.: US 9,253,067 B2
(45) Date of Patent: Feb. 2, 2016

(54) OAM IN OTN NETWORKS: GMPLS SIGNALING FOR TCM

(75) Inventors: Rajan Rao, Cupertino, CA (US); Khuzema Pithewan, Bangalore (IN); Ashok Kunjidhapatham, Bangalore (IN); Robert G. Bryttegard, Huntington Beach, CA (US); Biao Lu, Saratoga, CA (US); Mohit Misra, Bangalore (IN); Ramnarayan Srinivasan, Karnataka State (IN)

(73) Assignee: Infinera Corporation, Sunnyvale, CA (US)

( * ) Notice: Subject to any disclaimer, the term of this patent is extended or adjusted under 35 U.S.C. 154(b) by 828 days.

(21) Appl. No.: 13/428,911

(22) Filed: Mar. 23, 2012

(65) Prior Publication Data

US 2013/0114416 A1 May 9, 2013

Related U.S. Application Data

(60) Provisional application No. 61/555,539, filed on Nov. 4, 2011.

(51) Int. Cl.
*H04L 12/26* (2006.01)
*H04L 12/56* (2006.01)
*G06F 11/00* (2006.01)
*H04L 12/723* (2013.01)
*H04L 12/911* (2013.01)
*H04L 12/24* (2006.01)
*H04L 12/913* (2013.01)

(52) U.S. Cl.
CPC .............. *H04L 43/10* (2013.01); *H04L 45/50* (2013.01); *H04L 47/825* (2013.01); *H04L 41/06* (2013.01); *H04L 43/0811* (2013.01); *H04L 43/0858* (2013.01); *H04L 47/724* (2013.01)

(58) Field of Classification Search
USPC .................................... 370/241, 389
See application file for complete search history.

(56) References Cited

U.S. PATENT DOCUMENTS

2010/0118872 A1* 5/2010 Shirai et al. .................. 370/389

* cited by examiner

Primary Examiner — Kiet Tang
(74) Attorney, Agent, or Firm — David L. Soltz

(57) ABSTRACT

Methods and nodes are disclosed for OAM configuring one or more tandem connection monitoring layers through GMPLS signaling during GMPLS sub-network connection (SNC) establishment. Additionally, methods and nodes are disclosed for OAM configuring one or more tandem connection monitoring layers through GMPLS signaling after GMPLS sub-network connection establishment, that is, for existing connections.

14 Claims, 10 Drawing Sheets

OAM IN OTN NETWORKS: GMPLS SIGNALING FOR TCM

CROSS-REFERENCE TO RELATED APPLICATIONS

The present patent application claims priority to the provisional patent application identified by U.S. Ser. No. 61/555,539 titled "OAM in OTN networks: GMPLS signaling for TCM" filed on Nov. 4, 2011, the entire content of which is hereby incorporated herein by reference.

FIELD OF THE DISCLOSURE

The disclosure generally relates to methods and apparatuses in signaling connection oriented networks for sub-network monitoring. More particularly the disclosure relates to methods and apparatuses for Operation, Administration and Maintenance (OAM) establishment of Tandem Connection Monitoring (TCM) and Path Monitoring (PM) for optical channel data unit (ODU) connections in switched optical transport networks (OTN) using GMPLS signaling. Though the methodologies set forth herein are in the context of GMPLS based traffic engineering (TE) routing for OTN networks, such methodologies may be applied to any interface/network that supports different types of label switched paths.

BACKGROUND

Traffic Engineering (TE) is a technology that is concerned with performance optimization of networks. In general, Traffic Engineering includes a set of applications mechanisms, tools, and scientific principles that allow for measuring, modeling, characterizing and control of user data traffic in order to achieve specific performance objectives.

Multiprotocol label switching (MPLS) is a scheme in a high-performance telecommunication network which directs and carries data from one node to the next node in the network. In MPLS, labels are assigned to data packets. Packet forwarding decisions from one node to the next node in the network are made based on the contents of the label for each data packet, without the need to examine the data packet itself.

A circuit switched network usually includes multiple switch nodes (also referred to as "nodes") which are arranged in a topology referred to in the art as a "shared mesh network." Within the shared mesh network, user traffic can be transported between any two locations using predefined connections specifying particular links and/or switch nodes for conveying the user traffic.

The switch nodes are each provided with a control module. The control modules of the switch nodes function together to aid in the control and management of the circuit switched networks. The control modules can run a variety of protocols for conducting the control and management (Operation, Administration and Maintenance—referred to as OAM) of the circuit switched networks. One prominent protocol is referred to in the art as Generalized Multiprotocol Label Switching (GMPLS).

Generalized Multiprotocol Label Switching (GMPLS) is a type of protocol which extends multiprotocol label switching (MPLS) to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel. In particular, time-division multiplexing (TDM) is a type of digital multiplexing in which two or more signals or bit streams are transferred as sub-channels in one communication channel, but are physically taking turns on the communication channel. The time domain is divided into several recurrent timeslots of fixed length, one for each sub-channel. After the last sub-channel, the cycle starts over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet by packet basis.

Generalized Multiprotocol Label Switching (GMPLS) includes multiple types of optical channel data unit (ODU) label switched paths (LSPs) including protection and recovery mechanisms which specify predefined (1) working connections within a shared mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. A first node of a path is referred to as a headend node. A last node of a path is referred to as a tailend node. Data is initially transmitted over the optical channel data unit (ODU) Label Switched Path (LSP), referred to as the working connection, and then, when a working connection fails, the headend node or tailend node activates one of the protecting connections for redirecting data within the shared mesh network. Shared Mesh Protection (SMP) is a common protection and recovery mechanism in transport networks, where multiple paths can share the same set of network resources for protection purposes.

GMPLS protocols can be used for dynamic signaling to setup or teardown Optical channel Data Unit (ODUk/ODUj) connections, which may be known as working or protecting connections. These ODUk/ODUj connections are known as Sub-Network Connections (SNC). Sub-network connections are logical connections between two or more connected nodes and may be as small as a section between two nodes. A sub-network exists within a single layer and is typically a subsection of a larger network. The entire route a signal takes through a network from headend node to tailend node may be referred to as a path.

Current GMPLS mechanisms for setting up ODUk/ODUj Label Switched Path (LSP)/Sub-Network Connections (SNCs) are detailed, for example, in RFC3473 and RFC4328, and sub-network connections are further defined in ITU-T G.805.

Both a path and a sub-network connection can be monitored for alarm and/or error conditions. A tandem connection can be defined on a path or a sub-network connection for the purpose of monitoring for alarm and/or error conditions. This monitoring is known as Path Monitoring (PM) and Tandem Connection Monitoring (TCM). Monitoring can determine signal fail (SF) and signal degrade (SD) conditions. Monitoring can also be used for fault localization, protection, and/or restoration under failure conditions. Monitoring the characteristics of a connection or path may include, for example, determining capacity, ability, defects, errors, alarms, signal fail conditions, signal degrade conditions, fault localization, connection protection, and/or connection restoration. Other characteristics of the connection may be monitored as well.

Activation and deactivation of tandem connections requires a sequence of configuration steps at one or more nodes. Activation of monitoring in a node, for example— activation of a Tandem Connection Monitoring layer, creates an entity within the node. Tandem connections are further explained in ITU-T G.709, G.805, and G874.1.

Tandem Connection Monitoring utilizes fields within the data overhead transmitted on the data plane in an optical transport network (OTN). The optical transport hierarchy (OTH) supports the operation and management aspects of optical transport networks (OTN) of various architectures, e.g., point-to-point (linear), ring and mesh architectures. One part of the optical transport hierarchy is a multiplex hierarchy, which is a hierarchy consisting of an ordered repetition of tandem digital multiplexers that produce signals of successively higher data rates at each level of the hierarchy. An exemplary multiplexing hierarchy may be specified by way of optical channel data units, i.e., ODUj, where j varies from 0 to 4; and optical channel transport units, i.e., OTUk, where k varies from 1 to 4. The optical channel data units refer to a frame format for transmitting data which can be either fixed in the amount of data and data rate or variable in the amount of data and/or data rate.

Like all other ODUjs, the ODU0 frame format includes a structure of four rows and 3824 columns. The ODU0 frame format is further divided into an ODUk overhead area (the first fourteen columns) and an optical channel payload unit (OPU) area. The optical channel payload unit (OPU) area contains two columns of overhead and 3808 columns of payload area which is available for the mapping of client data.

The ODUk overhead area is comprised of multiple fields including six Tandem Connection Monitoring (TCMi) overhead fields (TCM1, TCM2, TCM3, TCM4, TCM5, and TCM6) and a Path Monitoring (PM) overhead field. Tandem Connection Monitoring and Path Monitoring fields can be used in Tandem Connection Monitoring and in Path Monitoring to monitor connections and paths within optical transport networks. One or more Tandem Connection Monitoring fields can be used for fault localization, fast Sub-Network Connection restoration, segment protection, and/or fast segment restoration ITU-T G.709 further defines TCM fields and PM fields and defines TCM overhead bytes for six layers of TCM per ODUk connection.

TCMi Fields

The six Tandem Connection Monitoring fields are dedicated to six levels of tandem connection monitoring per ODUk connection. The number of monitored connections along an ODUk trail may vary between zero and six. The monitored connections may be nested, cascaded, or both nested and cascaded, or overlapped. The TCMi fields are each three bytes long and each includes the following sub-fields: a Trail Trace Identifier (TTI) field, a Bit Interleaved Parity 8 (BIP-8) field, a Backward Defect Indication (BDI) field, a Backward Error Indication and Backward Incoming Alignment Error (BEI/BIAE) field, and a status bits field indicating the presence of TCM overhead, incoming alignment error, or maintenance signal (STAT).

The TTI field can transport a 64 byte TTI signal broken up over a number of ODUk frames. The TTI field includes the following sub-fields: a Source Access Point Identifier (SAPI) field, a Destination Access Point Identifier (DAPI) field, and a network Operator Specific field. The SAPI field identifies the tandem connection trail source point. The DAPI field identifies the expected tandem connection trail sink (i.e. the trail end point). Access Point Identifiers (APIs) are globally unique in the APIs' layer network. The set of all APIs belonging to a single administrative layer network form a single API scheme. However, the scheme of APIs for each administrative layer network can be independent from the scheme in any other administrative layer network. The APIs may be available to other network operators. APIs typically do not change while the access point remains in existence. Normally, the API can identify the country and network operator which is responsible for routing to and from the access point.

The BIP-8 field is a one-byte Error Detection Code (EDC) signal. The BIP-8 field provides a bit interleaved parity-8 code. The contents of BIP-8 field are computed over the bits in the OPUk area of the ODUk frame I, and inserted in the BIP-8 field (associated with the tandem connection monitoring level) in ODUk frame i+2. The BIP-8 field is further described in ITU-T G.707.

The single-bit BDI field can convey, towards the source, a signal fail status detected in a tandem connection termination sink function.

The BEI/BIAE field is a four bit field which can convey, towards the source (upstream), the count of interleaved-bit blocks that have been detected as being in error by the corresponding ODUk tandem connection monitoring sink using the BIP-8 field code. The BEI/BIAE field is also used to convey in the upstream direction an incoming alignment error (IAE) condition that is detected in the corresponding ODUk tandem connection monitoring sink in the IAE overhead.

The STAT field is a three bit status field. The STAT field can be used to indicate the presence of a maintenance signal, or if there is no source tandem connection monitoring end point active, or if there is an incoming alignment error at the source tandem connection monitoring end point.

PM Field

The ODUk overhead portion also includes the Path Monitoring (PM) field. The PM field has similar sub-fields as those described for the TCM fields. The PM field is used for monitoring the end-to-end connection through the network. The PM field is further described in ITU-T G.709.

PM&TCM Field

The ODUk overhead portion also includes the PM&TCM field. The PM&TCM field includes the following sub-fields: six ODUk TCM Delay Measurement (DMti) fields (DM1, DMt2, DMt3, DMt4, DMt5, and DMt6); a Path Delay Measurement (DMp) field; and a reserved (RES) field.

For ODUk tandem connection monitoring, the one-bit tandem connection Delay Measurement (DMti) signals are defined to convey the start of the delay measurement test.

For ODUk path monitoring, the one-bit Path Delay Measurement (DMp) signal is defined to convey the start of the delay measurement test.

The DMti fields, the DMp field, and the associated signals are further described in ITU-T G.798.

The ODUk Reserved Overhead (RES) fields contain eight bytes and one bit (where the one bit is located in a sub-field in the PM&TCM field) and are reserved for future standardization.

Currently, GMPLS mechanisms exist for setting up ODUk/ODUj label switched paths/sub-network connections. However, a node in a connection oriented network must be manually and individually configured in order to enable the node in an optical transport network to utilize the ODUk Tandem Connection Monitoring fields and Path Monitoring fields for monitoring the sub-network connections in the optical transport network. The node is manually configured at each port connected to the client. This manual configuration of the node typically takes place after a connection is established. Additionally, typically only the nodes at the beginning and the end of the connection (known as the head end and tail end nodes, respectively) are configured in this manner to monitor the connection in the optical transport network (OTN), although intermediate nodes can also be configured.

Once the node is configured to monitor paths and/or tandem connections, the node is adapted to utilize the data in the PM and TCM fields, as well as to input data into the PM and TCM fields.

However, there currently is not a method or system within GMPLS protocol for dynamic signaling configuration and setup of Tandem Connection Monitoring layers for ODUk/ODUj connections on Label Switched Paths (LSPs).

SUMMARY

Methods and nodes are disclosed. The problem of dynamic signaling configuration of nodes in a connection oriented network for sub-network monitoring is addressed through a method and apparatus for OAM configuring of one or more tandem connection monitoring layers through GMPLS signaling during GMPLS sub-network connection (SNC) establishment. The problem is further addressed through a method and apparatus for OAM configuring one or more tandem connection monitoring layers through GMPLS signaling after GMPLS sub-network connection establishment, that is, for existing connections.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
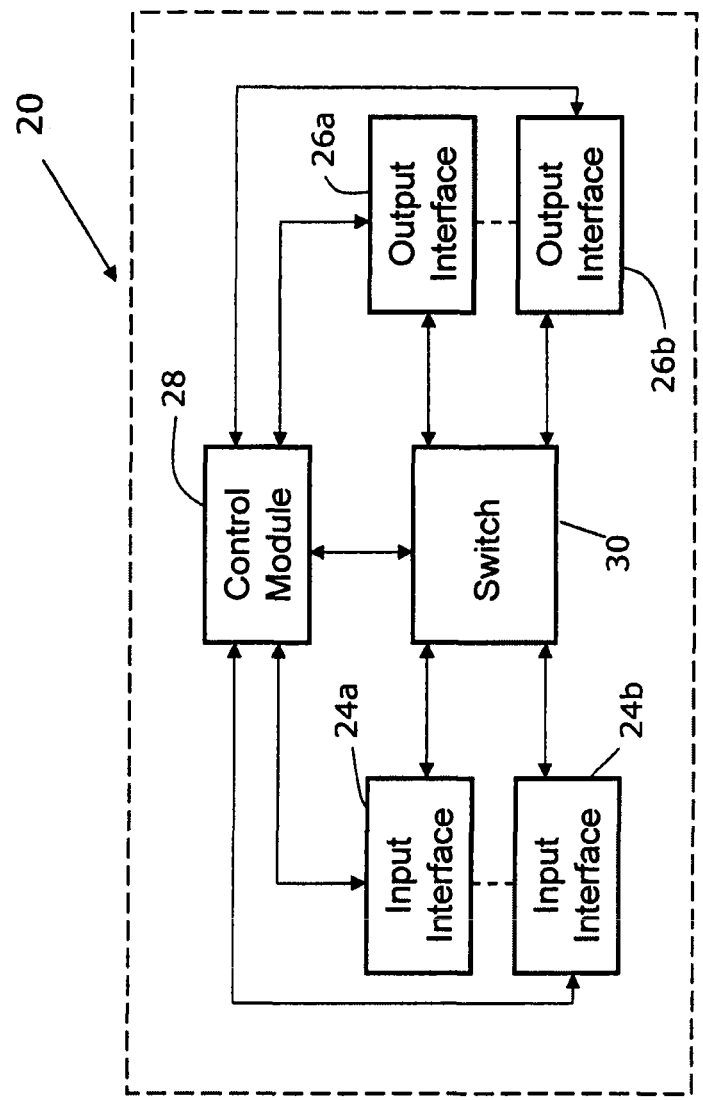
FIG. 1 is a block diagram of an exemplary node.

The following detailed description refers to the accompanying drawings. The same reference numbers in different drawings may identify the same or similar elements.

Definitions

If used throughout the description and the drawings, the following short terms have the following meanings unless otherwise stated:

A Connection Oriented (CO) Network is a network in which the devices at the end points of the network or sub-network use a protocol to establish a connection before data is sent. An optical transport network (OTN) is an example of a connection oriented network.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OAM stands for Operation, Administration and Maintenance.

ODU stands for Optical channel Data Unit. The ODU is an information structure comprised of the information payload (also known as optical channel payload unit, or OPU) and ODU-related overhead. Further, ODUkP stands for optical channel data unit path and ODUkT stands for optical channel data unit tandem connection.

OPU stands for optical channel payload unit. The OPU is the information structure used to adapt client information for transport over an optical channel. It comprises client information together with any overhead needed.

OSC stands for Optical Supervisory Channel which is an additional wavelength that normally carries network management information within an optical network.

OTN stands for Optical Transport Network which includes a set of optical switch nodes which are connected by optical fiber links. ITU-T recommendations G.709 and G.872 define exemplary OTN interface requirements and network architecture respectively.

OTU stands for Optical channel Transport Unit. The OTU is the information structure for transport of an optical channel data unit (ODU) over one or more optical channel connections.

SNC stands for Sub-Network Connection.

SONET/SDH stands for Synchronous Optical Networking/Synchronous Digital Hierarchy which are standardized multiplexer protocols that transfer multiple digital bit streams over optical fiber using lasers or light emitting diodes.

TCM stands for Tandem Connection Monitoring

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

TTI (also referred to as TxTI) stands for Trail Trace Identifier. An exemplary TTI for optical transport networks is defined in G.709. TTI may be sixty-four bytes long, with three parts: a sixteen byte Source Access Point Identifier (SAPI), a sixteen byte Destination Access Point Identifier (DAPI), and a thirty-two byte operator specific field.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, messages transmitted between nodes can be processed by circuitry within input interface(s), and/or output interface(s) and/or the control module. Circuitry could be analog and/or digital, components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

As discussed above, there currently is not a method or system within GMPLS protocol for dynamic signaling configuration and setup of Tandem Connection Monitoring layers for ODUk/ODUj connections on Label Switched Paths (LSPs). The present disclosure addresses these deficiencies with a methodology and apparatus for configuring one or more tandem connection monitoring layers through GMPLS signaling during GMPLS sub-network connection (SNC) establishment. The problem is further addressed through an apparatus and method for configuring one or more tandem connection monitoring layers through GMPLS signaling after GMPLS sub-network connection establishment, that is, for existing connections.

Figure 2:
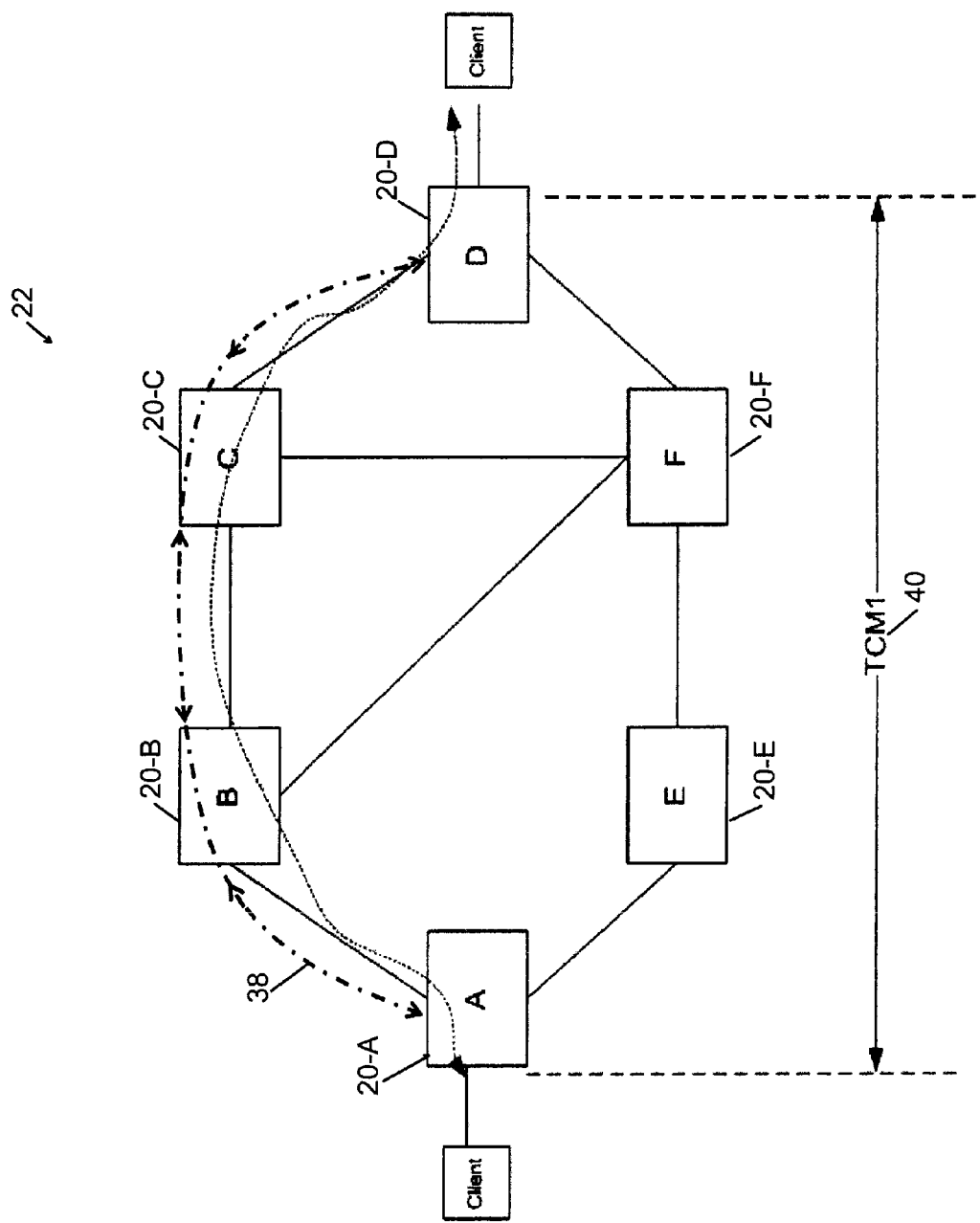
FIG. 2 illustrates an exemplary sub-network connection and tandem connection in a shared mesh optical transport network.

Referring now to the drawings, and in particular to FIG. 1, shown therein and designated by reference numeral 20 is an exemplary node constructed in accordance with the present disclosure. As will be discussed in more detail below, the node 20 is adapted to facilitate the communication of data (which may be referred to herein as "traffic") between multiple nodes 20 in a mesh network 22 (as shown in FIG. 2). The node 20 is provided with one or more input interfaces 24a and 24b, one or more output interfaces 26a and 26b, a control module 28, and a switch 30.

In general, the input interfaces 24a and 24b are adapted to receive traffic from the mesh network 22, and the output interfaces 26a and 26b are adapted to transmit traffic onto the mesh network 22. The switch 30 serves to communicate the traffic from the input interface(s) 24a and 24b, to the output interface(s) 26a and 26b. And, the control module 28 serves to control the operations of the input interfaces 24a and 24b, the output interfaces 26a and 26b, and the switch 30.

The node 20 can be implemented in a variety of manners, including, commercial installations having one or more backplanes (not shown), racks, and the like. In this example, the input interfaces 24a and 24b, the output interfaces 26a and 26b, the control module 28 and the switch 30 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interfaces 24a and 24b, the output interfaces 26a and 26b, the control module 28 and the switch 30 share a power supply and/or housing.

The input interfaces 24a and 24b, and the output interfaces 26a and 26b of one node 20 are adapted to communicate with corresponding input interfaces 24a and 24b, and output interfaces 26a and 26b of another node 20 within the mesh network 22 via a communication link 32 (as shown in FIG. 2). An example of an input interface 24 and/or an output interface 26 is an Ethernet card or optical port. In general, each of the input interfaces 24 and/or the output interfaces 26 may have a unique logical identification, such as an IP address. The communication link 32 can be implemented in a variety of manners, such as a physical link including electrical (e.g., copper wire or coax) and/or optical signal (e.g., optical fiber or other waveguide) carrying capabilities, or as a wireless link. The implementation of the input interfaces 24, and the output interfaces 26 will depend upon the particular type of communication link 32 that the particular input interface 24 and/or output interface 26 is designed to communicate with. For example, one of the input interfaces 24 can be designed to communicate wirelessly with another node 20 within the mesh network 22, while one of the output interfaces 26 of the node 20 can be designed to communicate optically through a fiber-optic link. For a particular node 20, the input interfaces 24a and 24b can be of the same type or different types; the output interfaces 26a and 26b can be of the same type or different types; and the input interfaces 24 and output interfaces 26 can be of the same type or different types.

It should be understood that the node can be implemented in a variety of manners including those shown and discussed in U.S. Patent Application No. 20090245289 entitled "Programmable Time Division Multiplexed Switching" the entire content of which is hereby incorporated herein by reference.

FIG. 2 illustrates a connection oriented network. The exemplary connection oriented network shown is a shared mesh optical transport network 22 (OTN); however, any type of connection is applicable, including unprotected, 1+1/1:N protected, restoration, or shared mesh protection connection. The nodes 20 in the optical transport network 22 may be in linear, ring, or mesh topologies.

Figure 3A:
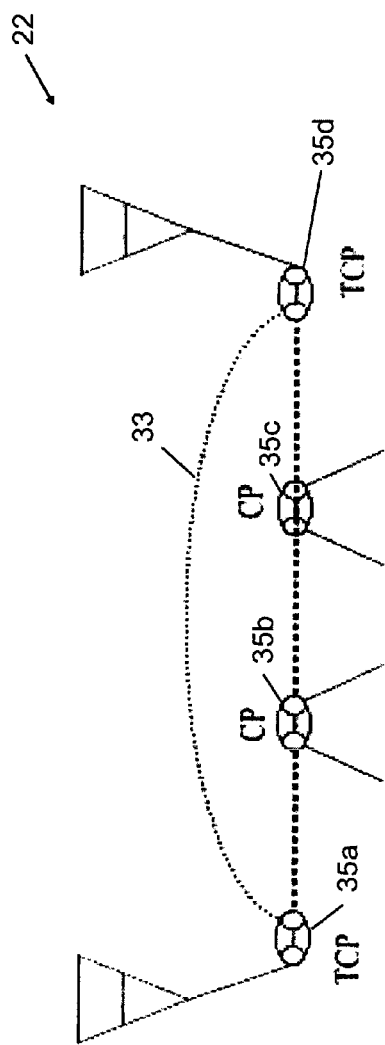
FIGS. 3A and 3B illustrate exemplary sub-network connections and tandem connections as set forth in ITU-T standard G.805.
Figure 3B:
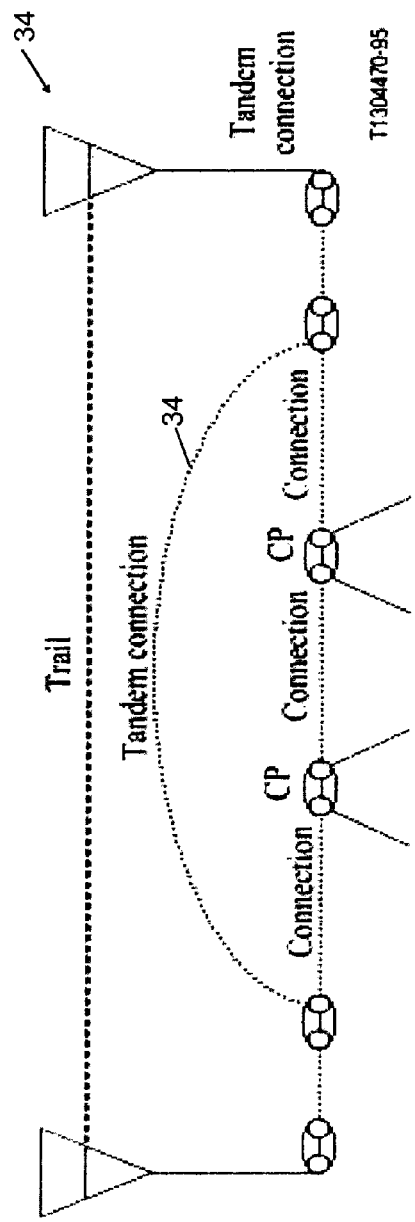

FIGS. 3A and 3B show another illustration of a connection oriented network 22 with a network connection 33, and a tandem connection 34 as illustrated in the ITU-T G.805 standard. ITU-T G.805 defines a connection point 35 as a source and sink for data transport. In FIG. 3a, four connection points 35a, 35b, 35c and 35d are illustrated. For example, a connection point may be a hop or (virtual) interface on a network connection. One physical interface can consist of multiple logical interfaces. For instance one for each distinguishable data flow. A layer is defined as the set of all possible connection points 35 of the same type. Two connection points 35 are of the same type if a data-transport function can be created between the connection points 35. In this example, each connection point 35 resides at one specific layer.

As shown in the example of FIG. 3B, the tandem connection 34 is a series of contiguous link connections, and the network connection 33 includes the tandem connection 34 between two connection points 35 where the tandem connection 34 is terminated for that layer, i.e., an end-to-end connection on a certain layer. Each of the connection points 35 can be assigned an identification and each of the connection points 35 can be independently configured for sub network monitoring, such as tandem connection monitoring or path monitoring as discussed in more detail below.

In FIG. 2, an ODUk sub-network connection 36 (SNC) is created, using GMPLS signaling messages, specifically, a sub-network connection establishment signal 38a, from node 20-A to node 20-B to node 20-C to node 20-D. The ODUk sub-network connection 36 (SNC) may be a working, protecting, restorable, or unprotected connection. The nodes 20 in the sub-network connection 36 utilize GMPLS protocols and the nodes' 20 control modules 28 are adapted to receiving signals 38 from other nodes 20.

Tandem connection monitoring (TCM1) may also be configured at the same time that the ODUk sub-network connection 36 is created, or the tandem connection monitoring may be configured or updated after the sub-network connection 36 is created.

In general, to configure tandem connection monitoring 40 in a node 20 in the sub-network connection 36 (A-B-C-D), the circuitry of the node 20 first receives a signal 38 from another node 20. For example, the circuitry of a first node 20-B receives a signal 38 from a second node 20-A. The signal 38 contains a message (not shown) which includes parameters to preferably configure hardware for monitoring the sub-network connection. This can be accomplished by a sub-network monitoring algorithm executable in the first node 20-B. The sub-network monitoring algorithm can be executable on one or more of the input interfaces 24, one or more of the output interfaces 26 and/or the control module 28.

Specifically, to configure tandem connection monitoring in an optical transport network 22 sub-network connection 36, a GMPLS signal 38b is used in which the message in the GMPLS signal 38b is a reservation protocol (RSVP) path message. RSVP path messages are defined in RFC 3473. The reservation protocol (RSVP) path message preferably contains a specification object 50, which further contains at least one sub-object 52.

Figure 4:
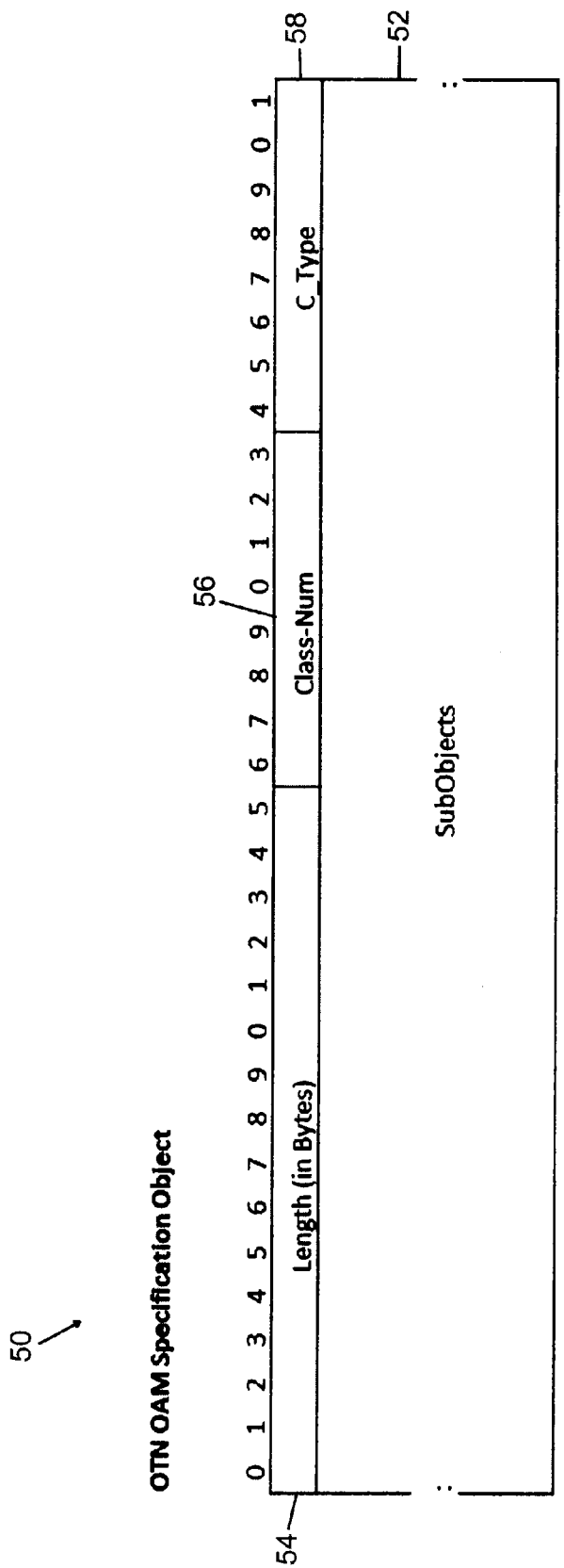
FIG. 4 exemplifies an optical transport network Operation, Administration and Maintenance specification object.

FIG. 4 illustrates an exemplary specification object 50. The specification object 50 may be a variable length object that can be adapted to carrying tandem connection monitoring (TCM) specifications and trail trace identifier (TTI) information. In one embodiment, the specification object 50 may have identification fields including a length field 54, a class-number field 56, and a C_Type field 58. The class of the specification object 50 is an optical transport network (OTN) Operation, Administration, and Maintenance (OAM) Specification. In this example, the C_Type of the specification object 50 is equal to one.

The sub-objects 52 contained in the specification object 50 are adapted to configure the node 20 to monitor tandem connection monitoring (TCM) layers and path monitoring (PM) layers. (The ODUk Path Monitoring Layer is described in ITU-T G.870, for example.) The sub-objects 52 in the specification object 50 are added to the GMPLS signaling message and may be carried to the nodes 20 along the ODUk/ODUj sub-network connection 36 and/or through the control plane. Each node 20 inspects the signaling message and takes action to initiate Tandem Connection Monitoring in the manner prescribed in the signaling message. An entity within the node 20 is created when the TCM layer is configured in the node 20. The entity is indicative of monitoring of the sub-network connection 36 occurring at the connection points 35. These entities are more fully described in ITU-T G.874.1, for example.

Many different types of sub-objects 52 may be used for different monitoring configurations. Additionally, multiple sub-objects 52 of different types may be used so that the TCM layers may be in different configurations, as needed for monitoring. For example, a specification object 50 may include sub-objects 52 for configuring trail trace identifier (TTI) for all six TCM layers and the PM layer for a given connection. In another example, sub-objects 52 may be used for TTI configuration on all layers and/or for Restoration Attribute configuration on all layers of an ODUk including ODUk PM layer and ODUk TCM layer. Alternatively, the specification object 50 may include sub-objects 52 to configure only some of the TCM layers and PM layers, as needed. Preferably, a given signaling message is meant for one sub-network connection 36.

Examples of sub-objects 52 include the following types:
1. ODUkP TTI Sub-Object
2. ODUkP Restoration Attributes Sub-Object
3. Tandem Connection Specification Sub-Object
4. TCM TTI Sub-Object
5. TCM Restoration Attributes Sub-Object The ODUkP TTI Sub-Object 52-1 and the ODUkP Restoration Attributes Sub-Object 52-2 are applicable for ODUk Path Monitoring Layer.

The Tandem Connection Specification Sub-Object 52-3, TCM TTI Sub-Object 52-4, and the TCM Restoration Attributes Sub-Object 52-5 are applicable for TCM layers 60.

These exemplary sub-objects 52 are explained in further detail below:

ODUkP TTI Sub-Object

Figure 5:
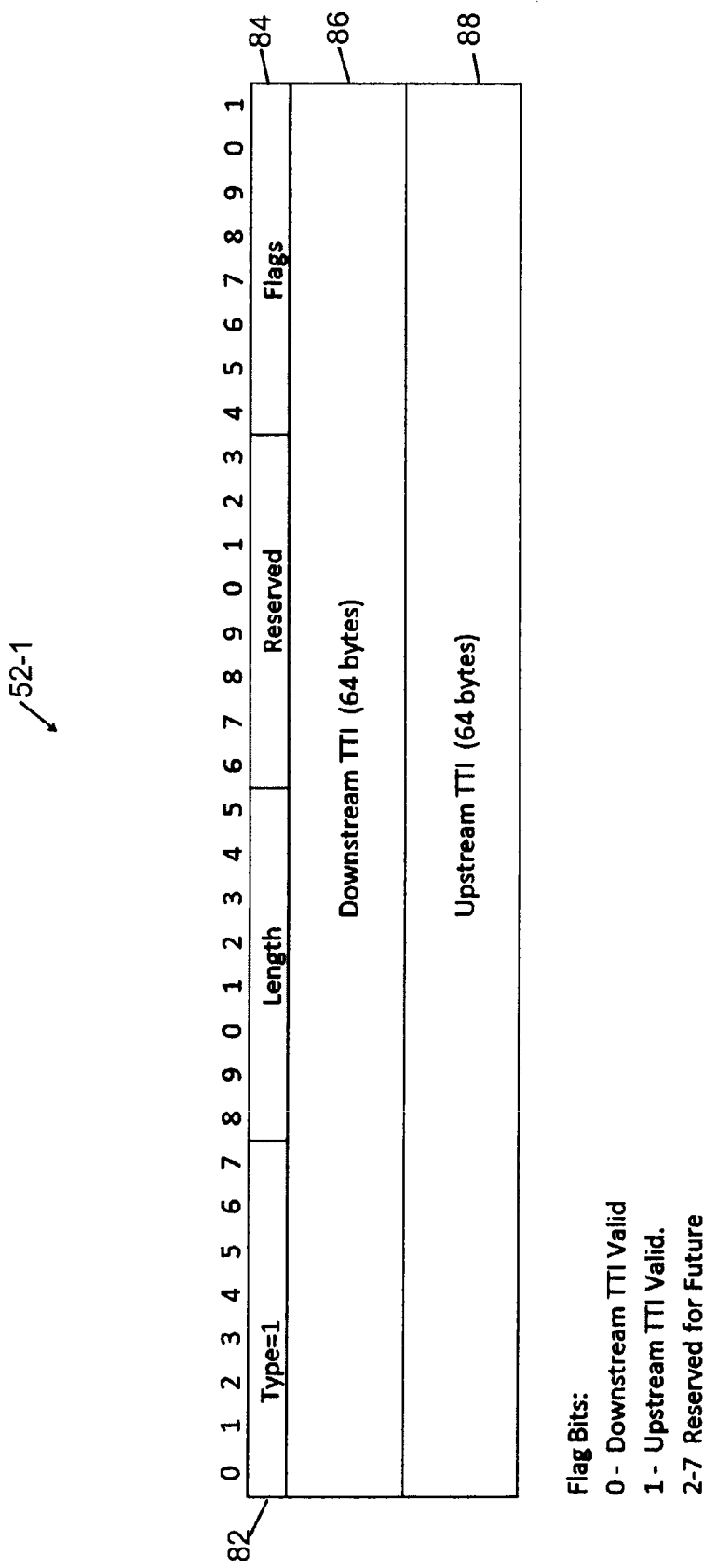
FIG. 5 exemplifies an optical data unit path trail trace identifier sub-object.

As illustrated in FIG. 5, the ODUkP TTI Sub-Object 52-1 may be an optical data unit path trail trace identifier sub-object which comprises a type field 82 indicative of a classification of the sub-object 52, a flags field 84, a downstream trail trace identifier (TTI) field 86, and an upstream trail trace identifier (TTI) field 88. In the example set forth in FIG. 5, the classification of the ODUkP TTI Sub-Object 52-1 is type one.

In one embodiment, the flags field 84 is indicative of whether downstream TTI or upstream TTI included is valid or not valid. If a given TTI field 86 and/or 88 is invalid, the flags field 84 may be coded as all zeros. The downstream trail trace identifier field 86 comprises a source access point identification (SAPI), a destination access point identification (DAPI), and an operator specific field (not shown). The upstream trail trace identifier field 88 comprises a source access point identification (SAPI), a destination access point identification (DAPI), and an operator specific field (not shown). The SAPI may be sixteen bytes and the DAPI may be sixteen bytes. The operator specific field may be thirty-two bytes. The TTI coding may be ordered with SAPI first, DAPI second, and the operator specific field third.

ODUkP Restoration Attributes Sub-Object

Figure 6:
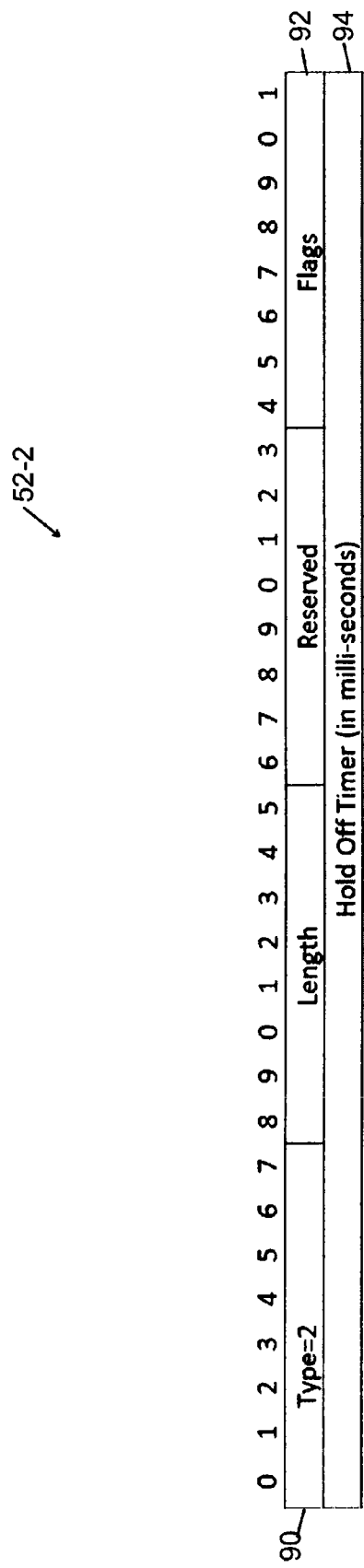
FIG. 6 exemplifies an optical data unit path restoration attributes sub-object.

As illustrated in FIG. 6, the ODUk Path Restoration Attributes Sub-object 52-2 may comprise a type field 90 indicative of a classification of the sub-object 52, a flags field 92, and a hold-off timer field 94. In the example of FIG. 6, the classification of the ODUk Path Restoration Attributes Sub-object 52-2 is type two.

Inclusion of the ODUk Path Restoration Attributes Sub-Object 52-2 is indicative of enablement of Restoration on the ODUkP layer. The hold-off timer field 94 is indicative of an amount of time the node 20 waits to switch traffic from a working connection to a protecting connection. Having the node 20 wait before switching traffic helps ensure that the working connection is truly restored.

Tandem Connection Specification Sub-Object

Figure 7:
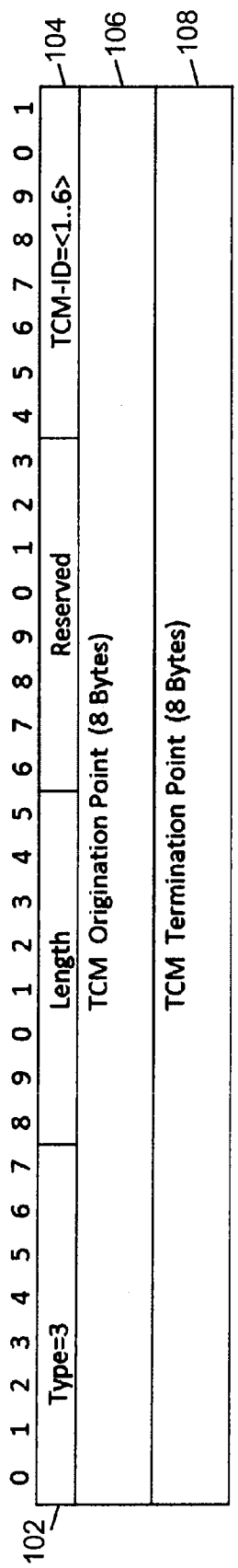
FIG. 7 exemplifies a tandem connection specification sub-object.

As illustrated in FIG. 7, the Tandem Connection Specification Sub-Object 52-3 may comprise a type field 102 indicative of a classification of the sub-object 52, a tandem connection monitoring (TCM) layer identification field 104, a tandem connection origination point 106 field, and a tandem connection termination point 108 field. In the example depicted in FIG. 7, the classification of the Tandem Connection Specification Sub-Object 52-3 is type three.

The operator preferably provides information as to which Tandem Connection Monitoring layer 60 is to be configured in the form of a Tandem Connection Monitoring Layer Identifier in the TCM layer identification field 106. The TCM layer identifier field 106 may be an eight byte field.

The operator also preferably provides the Tandem Connection Monitoring Origination Point 106 and the Tandem Connection Monitoring Termination Point 108. The Tandem Connection Monitoring Origination Point 106 and the Tandem Connection Monitoring Termination Point 108 may be identified by a router identification and a connection point identification <Router-ID, CP-ID> tuple. The router identification may be a thirty-two bit IPV4 address representing a network wide unique router identifier. The connection point identification may be a thirty-two bit identifier to uniquely identify a connection monitoring point on a given router. The definition of connection point (CP) may be in accordance with G.805 and G.808.1.

TCM TTI Sub-Object

Figure 8:
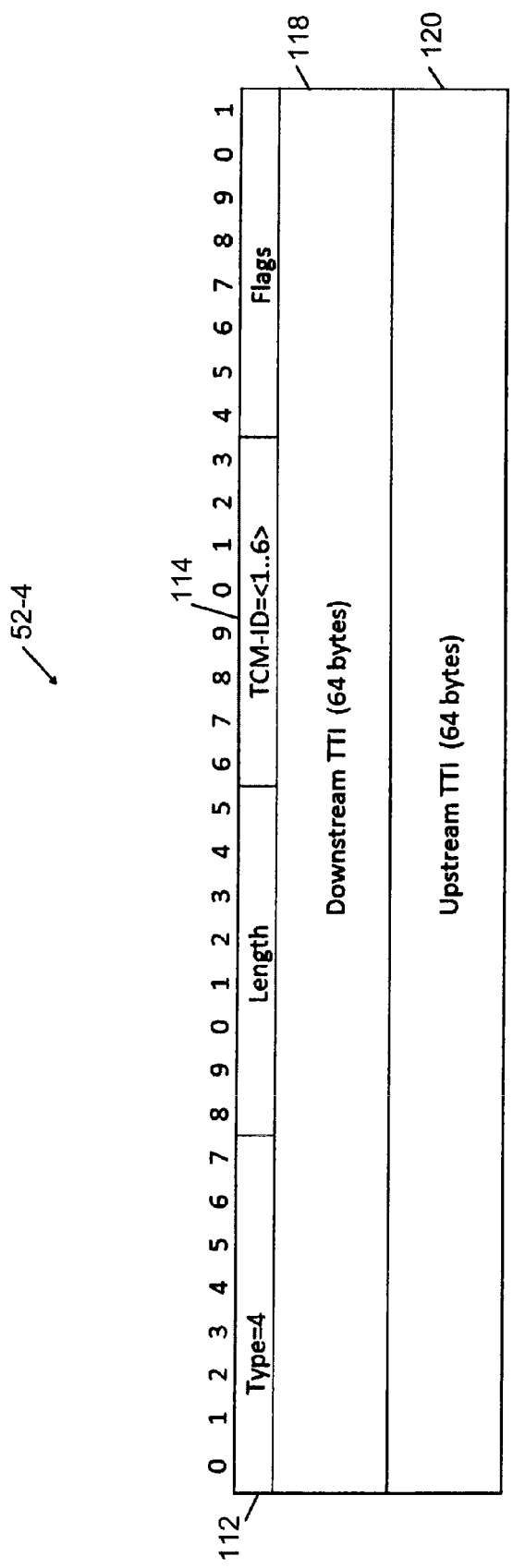
FIG. 8 exemplifies a tandem connection monitoring trail trace identifier sub-object.

As illustrated in FIG. 8, the TCM TTI Sub-Object 52-4 may be a Tandem Connection Monitoring Trail Trace Identifier sub-object that comprises a type field 112 indicative of a classification of the sub-object 52, a tandem connection monitoring layer identification field 114, a flags field 116, a downstream trail trace identifier (TTI) field 118, and an upstream trail trace identifier (TTI) field 120. In the example depicted in FIG. 8, the classification of the TCM TTI Sub-Object 52-4 is type four.

The flags field 116 is indicative of whether downstream TTI or upstream TTI included is valid or not valid. If a TTI field 118 and/or 120 is invalid, the flag field 116 may be coded as all zeros.

The downstream trail trace identifier (TTI) field 118 may comprise a source access point identification (SAPI), a destination access point identification (DAPI), and an operator specific field (not shown). The upstream trail trace identifier (TTI) field 120 comprises a source access point identification (SAPI), a destination access point identification (DAPI), and an operator specific field (not shown). The SAPI may be sixteen bytes, and the DAPI may be sixteen bytes. The operator specific field may be thirty-two bytes. The TTI coding may be ordered with SAPI first, DAPI second, and the operator specific field third.

TCM Restoration Attributes Sub-Object

Figure 9:
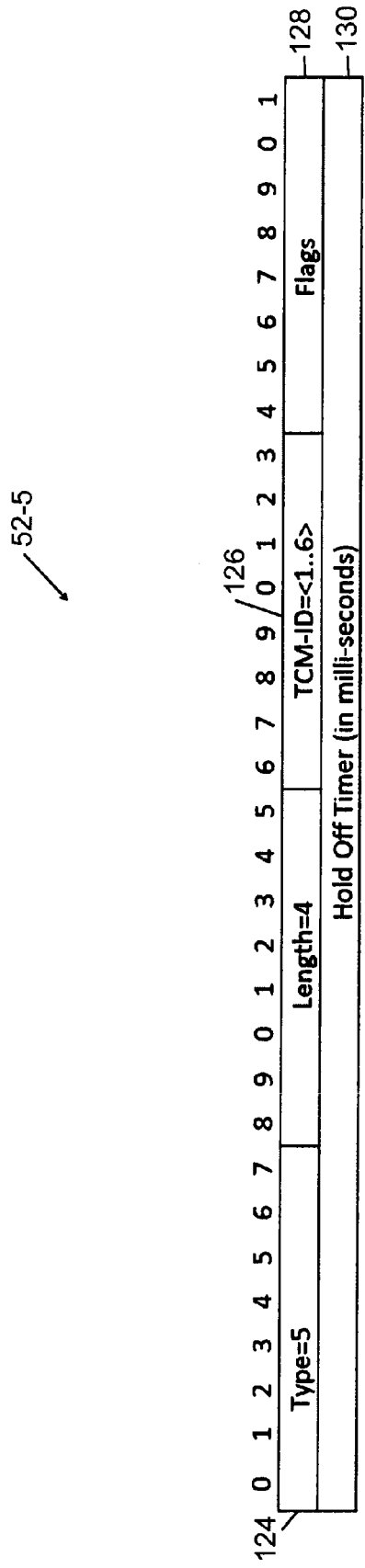
FIG. 9 exemplifies a tandem connection monitoring restoration attributes sub-object

As illustrated in FIG. 9, the Tandem Connection Monitoring (TCM) Restoration Attributes Sub-Object 52-5 may comprise a type field 124 indicative of a classification of the sub-object 52, a tandem connection monitoring layer identification field 126, a flags field 128, and a hold-off timer field 130. In the example depicted in FIG. 9, the classification of the TCM Restoration Attributes Sub-Object 52-5 is type five.

Inclusion of the TCM Restoration Attributes Sub-Object 52-5 is indicative of enablement of Restoration of sub-network connection 36. The hold-off timer field 130 is indicative of an amount of time the node 20 waits after a working connection is restored before switching traffic from a protecting connection to the working connection. Having the node 20 wait before switching traffic helps ensure that the working connection is truly restored.

Order of Sub-Objects

As discussed above, multiple sub-objects 52 may be encoded in the same OTN OAM specification object 50. When multiple sub-objects 52 are encoded in the same OTN OAM specification object 50, then a specified order for the sub-objects 52 may be followed. An exemplary specified order is as follows:

1. Sub-Objects pertaining to ODUKP
2. Sub-Objects pertaining to ODUKT (TCM=1)
3. Sub-Objects pertaining to ODUKT (TCM=2)
4. Sub-Objects pertaining to ODUKT (TCM=3)
5. Sub-Objects pertaining to ODUKT (TCM=4)
6. Sub-Objects pertaining to ODUKT (TCM=5)
7. Sub-Objects pertaining to ODUKT (TCM=6)

A path monitoring (PM) layer or tandem connection monitoring (TCM) layer that is not specified may be skipped without altering the order. Sub-objects 52 pertaining to each layer or layer instance may be ordered in the increasing order of type value. Multiple tandem connections with the same TCM-ID may be created on a given LSP, for example, multiple spans. Sub-objects 52 pertaining to each of the connections (span) may be encoded one after another.

One example of multiple sub-objects 52 encoded in a manner following the above exemplary specified order is as follows:

Sub-Object Type-1 (ODUkP)
Sub-Object Type-2 (ODUkP)
Sub-Object Type-3 (TCM-ID=1)
Sub-Object Type-4 (TCM-ID=1)
Sub-Object Type-5 (TCM-ID=1)
Sub-Object Type-3 (TCM-ID=2, Span=1)
Sub-Object Type-4 (TCM-ID=2, Span=1)
Sub-Object Type-5 (TCM-ID=2, Span=1)
Sub-Object Type-3 (TCM-ID=2, Span=2)
Sub-Object Type-4 (TCM-ID=2, Span=2)
Sub-Object Type-5 (TCM-ID=2, Span=2)
Sub-Object Type-3 (TCM-ID=3)
Sub-Object Type-4 (TCM-ID=3)
Sub-Object Type-5 (TCM-ID=3)
. . . continuing in the same pattern . . .
Sub-Object Type-3 (TCM-ID=6)
Sub-Object Type-4 (TCM-ID=6)
Sub-Object Type-5 (TCM-ID=6)

Sequence

Figure 10:
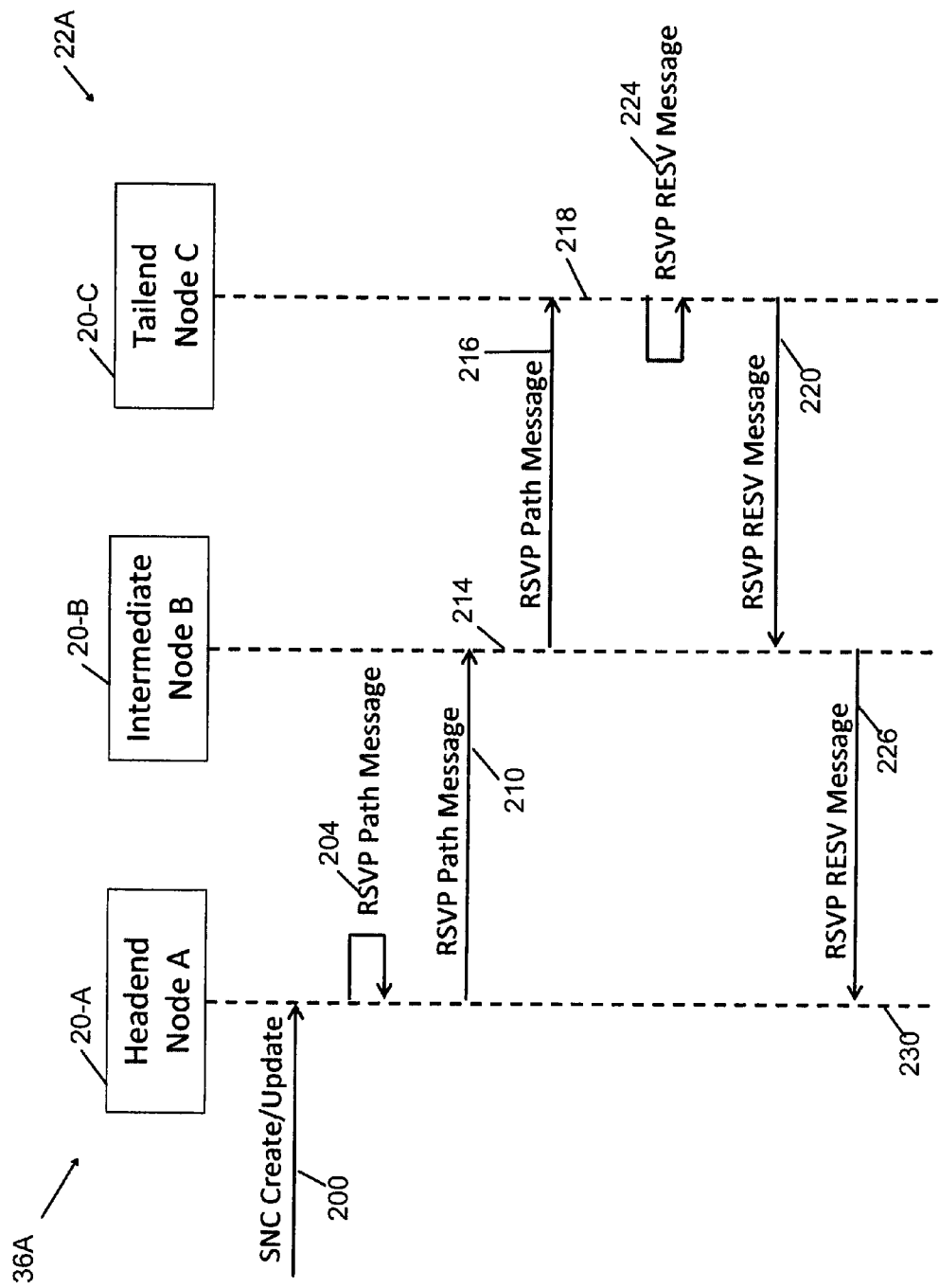
FIG. 10 illustrates an exemplary sequence of the configuration of nodes in a sub-network connection in an optical transport network (OTN) for sub-network monitoring using GMPLS signaling with RSVP Path messages containing specification objects with sub-objects.

FIG. 10 illustrates an exemplary sequence of the configuration of nodes 20 in a sub-network connection 36a that is similar to the sub-network connection 36 shown in FIG. 2, with the exception that the sub-network connection 36a includes three nodes 20, rather than four nodes 20. The sub-network connection 36a is in an optical transport network (OTN) 22a for sub-network monitoring using GMPLS signaling with RSVP Path messages containing specification objects 50 with sub-objects 52. This sequence may occur with the sub-network connection 36a creation or as an update after the sub-network connection 36a is created. The sub-network connection 36a shown has three nodes—headend node 20-A, intermediate node 20-B, and tailend node 20-C. Initially, in step 200, the headend node 20-A receives a RSVP Path message 204 containing OTN OAM specification object(s) 50. In step 206, Headend node 20-A processes the RSVP Path message 204 and creates TCM layers 60 and/or PM layer pertaining to the node 20-A as directed by the sub-object 52 or multiple sub-objects 52 contained in the specification object 50.

The RSVP Path message 204 proceeds, in step 210, to intermediate node 20-B. In step 214, Intermediate node 20-B processes the RSVP Path message and creates TCM layers and/or PM layer pertaining to the node 20-A as directed by the sub-object 52 or multiple sub-objects 52 contained in the specification object 50.

In step 216, The RSVP Path message 204 proceeds to tailend node 20-C. In step 218, tailend node 20-C processes the RSVP Path message and creates TCM layers and/or PM layer pertaining to the node as directed by the sub-object 52 or multiple sub-objects 52 contained in the specification object 50.

In step 220, tailend node 20-C sends an acknowledgement back to intermediate node 20-B in the form of a RSVP reservation (RESV) message 224. If tailend node 20-C is unable to create and configure the TCM layers and or PM layer as directed, the RSVP RESV message 224 would indicate the failure. In step 226, intermediate node 20-B also sends an acknowledgement back to headend node 20-A in the form of the RSVP reservation message 224. If intermediate node 20-B is unable to create and configure the TCM layers 60 and/or PM layer as directed, the RSVP RESV message 224 would indicate the failure. In step 230, headend node 20-A processes the RSVP RESV messages 224.

CONCLUSION

Conventionally, there is not a method or system within GMPLS protocol for dynamic signaling configuration and setup of Tandem Connection Monitoring layers for ODUk/ODUj connections on Label Switched Paths (LSPs). In accordance with the present disclosure, methods and apparatuses for Operation, Administration and Maintenance (OAM) establishment of Tandem Connection Monitoring (TCM) and Path Monitoring (PM) for optical channel data unit (ODU) connections in switched optical transport networks (OTN) through GMPLS signaling are disclosed.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes. In this situation, the nodes may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

[G.707], International Telecommunications Union, ITU-T Recommendation G.707, "Network node interface for the synchronous digital hierarchy (SDH)," January 2007.

[G.709], International Telecommunications Union, ITU-T Recommendation [G.709-v3], "Interfaces for the Optical Transport Network (OTN)", G.709 Recommendation, December 2009.

[G.783], International Telecommunications Union, ITU-T Recommendation G.783, "Characteristics of synchronous digital hierarchy (SDH) equipment functional blocks," March 2006.

[G.805], International Telecommunications Union, ITU-T Recommendation G.805, "Generic functional architecture of transport networks," March 2000.

[G.808.1], International Telecommunications Union, ITU-T Recommendation G.808.1, "Generic protection switching—Linear trail and subnetwork protection," February 2010.

[G.872], International Telecommunications Union, ITU-T Recommendation G.872, "Architecture of optical transport networks", November 2001 (11 2001).

[G.874.1], International Telecommunications Union, ITU-T Recommendation G.874.1, "Optical Transport Network (OTN) Protocol-neutral management information model for the network element view," January 2002.

[RFC3471] Berger, L., "Generalized Multi-Protocol Label Switching (GMPLS) Signaling Functional Description", RFC 3471, January 2003.

[RFC3473] Generalized Multi-Protocol Label Switching (GMPLS) Signaling Resource ReserVation Protocol-Traffic Engineering (RSVP-TE) Extensions, Berger (Ed.), The Internet Society, January 2003.

[RFC3945] Mannie, E., "Generalized Multi-Protocol Label Switching (GMPLS) Architecture", RFC 3945, October 2004.

[RFC4328] Papadimitriou, D., "Generalized Multi-Protocol Label Switching (GMPLS) Signaling Extensions for G.709 Optical Transport Networks Control", RFC 4328, January 2006.

[RFC4379] Detecting Multi-Protocol Label Switched (MPLS) Data Plane Failures, Kombella, K. and Swallow, G., The Internet Society, February 2006.

What is claimed is:

1. A method comprising:
    receiving a signal by circuitry of a first node from a second node, with the first node and the second node part of a connection oriented network adapted to use protocols to establish at least one sub-network connection to facilitate transfer of data between the first node and the second node, the first node and the second node utilizing Generalized Multiprotocol Label Switching (GMPLS) protocols, the signal having a message including parameters; and
    configuring the circuitry of the first node for sub-network monitoring of at least one characteristic of the sub-network connection by a sub-network monitoring algorithm executing on the first node with the parameters,
    wherein the connection oriented network is an optical transport network,
    wherein the signal comprises a sub-network connection establishment signal adapted to establish the sub-network connection and enable the sub-network monitoring,
    wherein the sub-network connection establishment signal comprises a first identifier indicative of an origination point of a tandem connection that is a starting point for the sub-network monitoring, a second identifier indicative of a termination point of the tandem connection that is an ending point for the sub-network monitoring, and a third identifier indicative of a layer associated with the tandem connection.

2. The method of claim 1, wherein the message is a reservation protocol path message used by the circuitry to set up the sub-network connection to be monitored by the sub-network monitoring algorithm in accordance with the parameters.

3. The method of claim 1, wherein the signal is received by the first node after setup of the sub-network connection to be monitored by the sub-network monitoring algorithm in accordance with the parameters.

4. The method of claim 2, wherein the message comprises a specification object comprising at least one sub-object having one or more of the parameters for configuring the sub-network monitoring.

5. The method of claim 1, wherein the algorithm is adapted to create at least one entity in the first node when the first node is configured for the sub-network monitoring.

6. The method of claim 1, wherein the sub-network monitoring is tandem connection monitoring.

7. The method of claim 1, wherein the sub-network monitoring is path monitoring.

8. The method of claim 4, wherein receiving a signal is receiving a first signal and:
    sending, by circuitry of the first node, a second signal indicative of availability of the first node to configure the first node for sub-network monitoring with the at least one sub-object.

9. The method of claim 8, wherein the first signal is a resource reservation protocol path message and the second signal is a resource reservation protocol reservation message.

10. A node comprising:
    an input interface;
    an output interface; and
    one or more control module utilizing Generalized Multi-protocol Label Switching (GMPLS) protocols and adapted to receive a signal from another node in a connection oriented network adapted to use protocols to establish at least one sub-network connection to facilitate transfer of data, the signal having a message including parameters for configuring one or more of the input interface and the output interface, such that the one or more of the input interface and the output interface execute an algorithm to monitor at least one characteristic of the sub-network connection,
    wherein the parameters include a first identifier indicative of an origination point of a tandem connection that is a starting point for the sub-network monitoring, a second identifier indicative of a termination point of the tandem connection that is an ending point for the sub-network monitoring, and a third identifier indicative of a layer associated with the tandem connection.

11. The node of claim 10, wherein the message is a reservation protocol path message used by the one or more control module to set up the sub-network connection to be monitored by the algorithm in accordance with the parameters.

12. The node of claim 10, wherein the message comprises a specification object comprising at least one sub-object having one or more of the parameters for configuring the sub-network monitoring.

13. The node of claim 10, wherein the sub-network monitoring is path monitoring.

14. The node of claim 10, wherein the signal comprises a sub-network connection establishment signal adapted to establish the sub-network connection and enable the sub-network monitoring.

* * * * *